US006778704B1

(12) United States Patent
Kawatani

(10) Patent No.: US 6,778,704 B1
(45) Date of Patent: Aug. 17, 2004

(54) METHOD AND APPARATUS FOR PATTERN RECOGNITION USING A RECOGNITION DICTIONARY PARTITIONED INTO SUBCATEGORIES

(75) Inventor: Takahiko Kawatani, Kanagawa (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/297,499

(22) PCT Filed: Oct. 30, 1997

(86) PCT No.: PCT/US97/19750

§ 371 (c)(1),
(2), (4) Date: Jan. 4, 2002

(87) PCT Pub. No.: WO98/19268

PCT Pub. Date: May 7, 1998

(30) Foreign Application Priority Data

Oct. 30, 1996 (JP) .......................................... 08-288450

(51) Int. Cl.$^7$ ............................................... G06K 9/62
(52) U.S. Cl. ...................... 382/224; 382/159; 382/209; 382/197; 706/20; 706/25; 706/26
(58) Field of Search ............................... 382/171, 174, 382/178, 190, 199, 203, 224–226, 290, 159; 706/20, 25–26; 704/200

(56) References Cited

U.S. PATENT DOCUMENTS

| 4,989,258 A | * | 1/1991 | Takahashi et al. | .......... 382/226 |
| 4,998,285 A | * | 3/1991 | Suzuki et al. | ............... 382/171 |
| 5,255,342 A | * | 10/1993 | Nitta | .......................... 704/200 |
| 5,408,638 A | * | 4/1995 | Sagawa et al. | ............... 716/20 |
| 5,479,570 A | * | 12/1995 | Imagawa et al. | ............. 706/20 |
| 5,671,293 A | * | 9/1997 | Niki | ........................... 382/224 |
| 5,689,584 A | * | 11/1997 | Kobayashi | ................. 382/190 |
| 5,825,920 A | * | 10/1998 | Kitamura et al. | ........... 382/178 |
| 5,966,701 A | * | 10/1999 | Kohda et al. | .................. 706/20 |
| 6,009,199 A | * | 12/1999 | Ho | .............................. 382/224 |
| 6,181,805 B1 | * | 1/2001 | Koike et al. | ................. 382/118 |
| 6,225,920 B1 | * | 5/2001 | Dayle | ........................... 341/21 |

FOREIGN PATENT DOCUMENTS

EP 0 574 937 A2 12/1993 ............ G06K/9/66

OTHER PUBLICATIONS

Takahiko Kawatani et al., "Shape Quantification of Hand-printed Numerals Using Recognition Results and Its Application", Systems and Computers in Japan, 1992, US, vol. 23, No. 5, pp. 55–66.

(List continued on next page.)

*Primary Examiner*—Bhavesh M. Mehta
*Assistant Examiner*—Gregory Deame

(57) ABSTRACT

A pattern recognition method that determines the category of an unknown pattern. The category is one of a set of categories corresponding to a set of known patterns. A subcategory-level recognition dictionary is provided that stores reference information for each one of plural subcategories obtained by partitioning the categories constituting the category set. A pattern signal respresenting the unknown pattern is received (12) and is processed to extract a feature vector from it. The reference information of one subcategory of each category in the recognition dictionary is selected (14, 16) from the recognition dictionary in response to the feature vector. Finally, a distance between the feature vector and the reference information of the subcategory of each category selected in the selected in the selecting step is determined (18) to determine the category of the unknown pattern. The subcategory-level recognition dictionary is generated in response to feature vectors extracted from training pattern signals representing respective training patterns. The recognition dictionary stores reference information for each one of plural categories constituting a category set. Each category is partitioned (54, 56) into $2^n$ subcategories, where n is greater than zero, and learning by discriminant analysis is applied (58, 62, 64, 68) to each subcategory to generate reference information for the subcategory.

7 Claims, 9 Drawing Sheets

OTHER PUBLICATIONS

Takahiko Kawatani, "Handprinted Numerals Recognition by Learning Distance Function", Systems and Computers in Japan, vol. 25, No 10, Sep. 1, 1994, pp. 62–71.

Takahiko Kawatani, "Handprinted Numerals Recognition by Learning Distance Function", Trans. IEICE, D–II, vol. J76–D–II, No. 9, pp. 1851–1859.

Takahiko Kawatani, "Handprinted Numeral Recognition with the Learning Distance Function", Proceedings, IWFHR III, Mar 25–27, 1993, pp. 324–330.

Takahiko Kawatani et al., "Handwritten Numeral Recognition with the Improved LDA Method", Proceedings of ICPR'96, 1015–4651/96, (IEEE 1996), pp. 441–446.

Takahiko Kawatani et al., "Improvement of the LDA Method and its Application to Handwritten Numeral Recognition", Technical Report of IEICE, PRU95–220 (Mar. 1996), pp. 31–38.

Takahiko Kawatani, "Handprinted Numeral Recognition with the Learnung Quadratic Discriminant Function", IEEE Computer Society, Reprint, Proceedings of the Second International Conference on Document Analysis and Recognition, Tsukuba Science City Japan, Oct. 20–22, 1993, pp. 14–17.

* cited by examiner

METHOD AND APPARATUS FOR PATTERN RECOGNITION USING A RECOGNITION DICTIONARY PARTITIONED INTO SUBCATEGORIES

FIELD OF THE INVENTION

The present invention relates to pattern recognition and in particular relates to a pattern recognition method and apparatus that uses partitioned categories to provide an improved recognition accuracy.

BACKGROUND OF THE INVENTION

Pattern recognition is the process by which a hand written or printed pattern is converted to a pattern signal representing the pattern, a determination is made of what pattern the pattern signal represents, and a code indicating the determined pattern is generated. For example, pattern representing an unknown character, such as the letter "A," may be scanned by an electronic scanner. The scanner generates a pattern signal composed of array of a few thousand bytes that represent the unknown character. The signal representing the bit map is then analyzed to determine the identity of the unknown character represented by the pattern and to generate a code identifying the character. For example, the ASCII code 65 representing the letter A may be generated.

Most pattern recognition devices can only recognize pattern signals representing patterns that are members of a predetermined pattern set. For example, a simple pattern recognition device may only be capable of recognizing pattern signals representing the numerals 0 through 9. A more complex pattern recognition device may be capable recognizing pattern signals representing the letters and numerals that are members of a pattern set corresponding to the ASCII character set. Pattern recognition devices typically include a recognition dictionary divided into categories, one for each of the patterns in the pattern set that the device is capable of recognizing. The recognition dictionary stores a typical pattern signal for each category. For example, the above-mentioned simple pattern recognition device may include a recognition dictionary divided into ten categories, one for each of the numerals 0 through 9. The recognition dictionary stores a typical pattern signal for the numeral corresponding to each category. To recognize the pattern represented by an unknown pattern signal, the pattern recognition device performs a matching operation between the unknown pattern signal and the pattern signals stored in the recognition dictionary. The matching operation determines which of the pattern signals stored in the recognition dictionary is closest to the unknown pattern signal. The unknown pattern signal is then deemed to represent the pattern corresponding to the category whose typical pattern signal is closest to the unknown pattern signal.

Many pattern recognition devices reduce the complexity of the matching operation by expressing the unknown pattern signal and the typical pattern signals stored in the recognition dictionary as vectors. To prevent confusion, a vector extracted from an unknown pattern signal will be called a feature vector, and a vector representing a pattern signal stored in the recognition dictionary will be called a reference vector.

In many pattern recognition devices, the matching operation involves determining the distance between the unknown pattern signal and the typical pattern signal of each of the categories by matching the feature vector extracted from the unknown pattern signal with the reference vector of each category stored in the recognition dictionary. The unknown pattern signal is deemed to belong to the category for which the distance is the smallest. Known functions for representing the distance between two vectors include the Euclidean distance, the weighted Euclidean distance, and the Mahalanobis distance.

To improve the accuracy of the pattern recognition operation performed by a pattern recognition device, the pattern recognition device may be trained using known patterns of the same style as the unknown pattern. For example, a pattern recognition device for handwriting recognition may require the writer to write a set of known patterns or characters for training purposes. Alternatively, training may be performed using handwritten training pattern sets written by many writers.

One way of training the distance function is called Learning by Discriminant Analysis (LDA), and is described by the inventor in *Handprinted Numeral Recognition by Learning Distance Function*, IEICE TRANS. D-II, vol. J76-D-11, 9, 1851–59 (1993) (in Japanese). LDA trains such parameters of the distance function as the reference vector, weighting vector, and the constant term by using a weighted Euclidean distance or a quadratic discriminant function as an original distance function and by superposing a discriminant function onto the original distance function. The discriminant function is determined by applying linear discriminant analysis between the pattern set of each category and a rival pattern set for the category. The rival pattern set for each category is composed of patterns that are mis-recognized as belonging to the category when the original distance function is used.

LDA features using not only the linear term of the feature vector, but also using the quadratic term as the linear terms in a linear discriminant. Test results show that this type of training provides a marked improvement in recognition accuracy. Using the weighted Euclidean distance, a recognition accuracy comparable to those obtained using the Mahalanobis distance function or using a quadratic discriminant function was achieved. The Mahalanobis distance function and the quadratic discriminant function both require a great deal of processing and memory to implement, whereas the Euclidian distance requires little memory and has a short processing time.

Satisfactory as present results are, the recognition accuracy of pattern recognition devices using LDA is not perfect. Improving the recognition accuracy of pattern recognition devices that use LDA involves increasing the discrimination ability of the discriminant function to separate a given category pattern set from its rival pattern set. The discriminant function is expressed by a quadratic equation of each component of the feature vector in which the products between the components are omitted. Consequently, the boundary between the given category pattern set and its rival pattern set, that is, the locus where the value of the discriminant function is 0, lies parallel to the feature axis and lies in a quadratic plane symmetric with respect to the center, as shown in FIG. 1.

It can be seen from FIG. 1 that, although the category pattern set 1 of the category lies safely within the boundary 2 defined by the quadratic function, the spacing between the boundary and the perimeter of the category pattern set is such that the boundary encompasses small parts of the rival pattern sets 3 of the category. The discriminant function has a positive value outside the boundary, a negative value inside the boundary, and a value of zero at the boundary. The polarity of the discriminant function inside and outside the boundary 2 is indicated by the circled – and the circled +, respectively, in FIG. 1. A pattern belonging to the part of the rival pattern set encompassed by the boundary will have a smaller distance from the category after the discriminant function is superposed onto the original function than the distance obtained using the original function. The pattern may therefore be incorrectly recognized as belonging to the category.

In pattern recognition, the category pattern set of each category often has an asymmetric distribution in feature space. Moreover, since the patterns that belong to the rival pattern set of a category usually belong to many categories, the rival patterns are considered to enclose an asymmetric pattern set of the given category in feature space. When the category pattern set and the rival pattern set of a given category have the distribution described above, completely separating these sets by a symmetric quadratic plane is difficult, and the unknown patterns located near the periphery of the pattern pattern set are easily mis-recognized.

Accordingly, an inability to adequately handle the asymmetry of the pattern distribution imposes limitations on improving the recognition accuracy. Therefore, what is needed is an apparatus and method that can handle asymmetric pattern distributions so that a high recognition accuracy can be attained notwithstanding asymmetric pattern distributions.

SUMMARY OF THE INVENTION

The invention provides a pattern recognition method that determines the category of an unknown pattern. The category is one of a set of categories corresponding to a set of known patterns. In the method, a subcategory-level recognition dictionary is provided that stores reference information for each one of plural subcategories obtained by partitioning the categories constituting the category set. A pattern signal representing the unknown pattern is received and is processed to extract a feature vector from it. The reference information of one subcategory of each category in the recognition dictionary is selected from the recognition dictionary in response to the feature vector. Finally, a distance between the feature vector and the reference information of the subcategory of each category selected in the selecting step is determined to determine the category of the unknown pattern.

The subcategory-level recognition dictionary is generated in response to feature vectors extracted from training pattern signals representing respective training patterns. The recognition dictionary stores reference information for each one of plural categories constituting a category set. In the method, each category is partitioned into $2^n$ subcategories, where n is an integer greater than zero, and learning by discriminant analysis is applied to each subcategory to generate reference information for the subcategory.

The invention further provides a pattern recognition apparatus that determines a category of an unknown pattern represented by a feature vector extracted from a pattern signal. The category is one of a set of categories corresponding to a set of known patterns. The apparatus comprises a subcategory-level recognition dictionary, a selecting module, a distance determining module and a module that determines the category of the unknown pattern. The subcategory-level recognition dictionary stores reference information for each one of plural subcategories obtained by partitioning the categories constituting the category set. The selecting module selects from the recognition dictionary the reference information of one subcategory of each category in response to the feature vector. The distance determining module determines a distance between the feature vector and the reference information of the subcategory selected by the selecting module for each of the categories. The module that determines the category of the unknown pattern makes this determination from the distance generated by the distance determining module for each of the categories.

Finally, the invention provides an apparatus for generating a subcategory-level recognition dictionary from feature vectors extracted from training pattern signals representing training patterns to generate reference information for each of plural categories constituting a category set. The apparatus comprises the partitioning section that partitions each category into $2^n$ subcategories, where n is an integer greater than zero, and a section that applies learning by discriminant analysis to each subcategory defined by the partitioning section to generate the reference information for the subcategory.

DETAILED DESCRIPTION OF THE INVENTION

Figure 1:
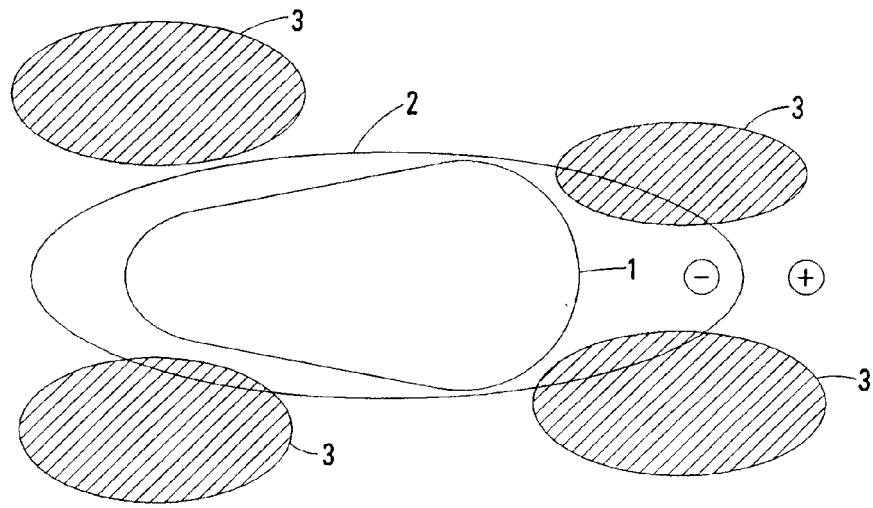
FIG. 1 is a map showing the relative locations of the category pattern set, rival pattern sets and the boundary defined by the discriminant function in a conventional pattern recognition apparatus based on learning by discriminant analysis.
Figure 2A:
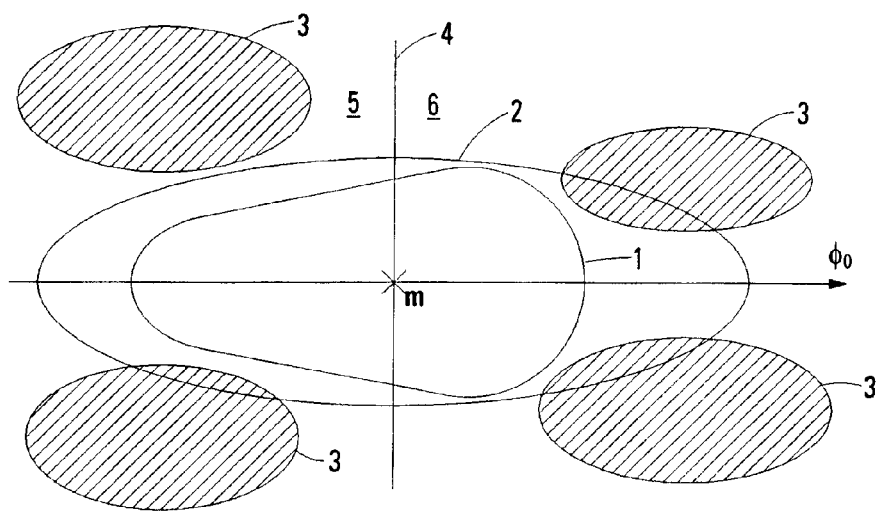
FIGS. 2A and 2B are maps showing the relative locations of the category pattern set, rival pattern sets and the boundary defined by the discriminant function when feature space is divided into two sub-spaces by a single partition vector.
Figure 2B:
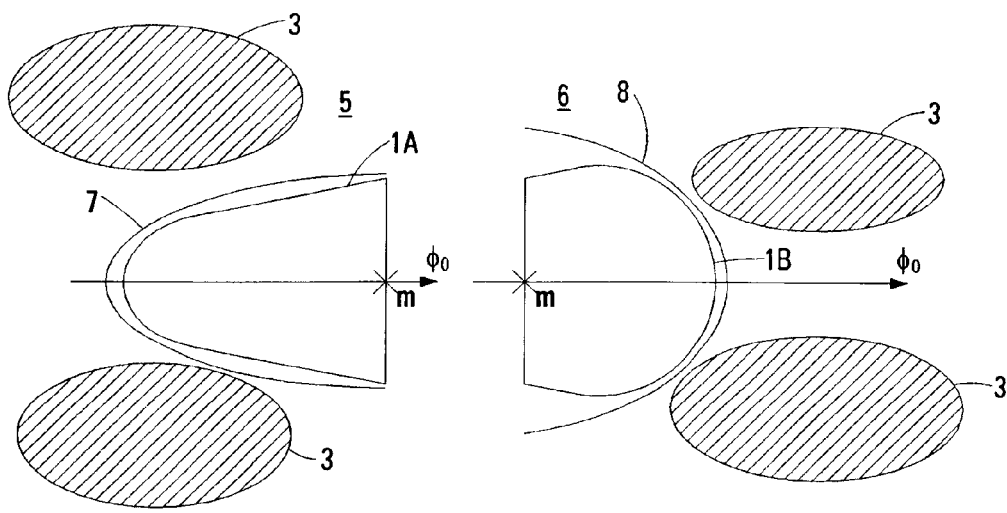

Using a single quadratic plane, it is difficult to separate the category pattern set of a given category from the rival pattern set when the pattern set has an asymmetric distribution, as described above. To overcome this difficulty, the apparatus and method according to the invention partition feature space into multiple sub-spaces. This effectively partitions each category into a corresponding number of subcategories. For example, FIG. 2A shows the partitioning plane 4 dividing the feature space of a category into the two subcategories 5 and 6, each of which has its own pattern subset and its own rival pattern subset. The mean vector of the category is indicated by m. The partitioning vector is indicated by $\phi_0$. If the pattern set of the subcategory can be separated from the rival pattern set in each partitioned sub-space, the boundary defined by quadratic function can be located much closer to the in-category pattern set. This reduces the difficulty of separating the pattern set of the category from the rival pattern set. FIG. 2B shows the category divided into the two subcategories 5 and 6. The category pattern set is divided into the two subcategory pattern sets 1A and 1B. Each subcategory has a new boundary, indicated by 7 and 8, respectively. Neither of the new boundaries encompasses part of the rival pattern set of the subcategory.

Partitioning each category into subcategories requires the creation of a subcategory-level recognition dictionary that has an entry for each subcategory. The subcategory-level recognition dictionary is created by applying LDA in the sub-space corresponding to each subcategory. This will be described in more detail below.

The number of subcategories into which each category is partitioned is a design choice.

The greater the number of subcategories, the easier it becomes to separate the category pattern set of the category from the rival pattern set, but the more complex the processing becomes. Typically, the number of subcategories is two or four.

The subcategory to which a training pattern or an unknown pattern belongs can be determined by calculating a value by projecting the feature vector of the pattern onto one or more predetermined partitioning vectors, and then comparing the resulting value with a predetermined threshold. To partition a category into $2^n$ subcategories requires n partitioning vectors, where n is greater than zero. For example, a single partitioning vector will partition a category into two subcategories.

If feature space is partitioned into $2^n$ sub-spaces as described above, the pattern set of the category as a whole is separated from the rival pattern set by $2^n$ quadratic planes in the partitioned space. Typically, $2^n$ is two or four, as noted above. This provides an improved separation ability that results in remarkable improvements in recognition accuracy.

Figure 3:
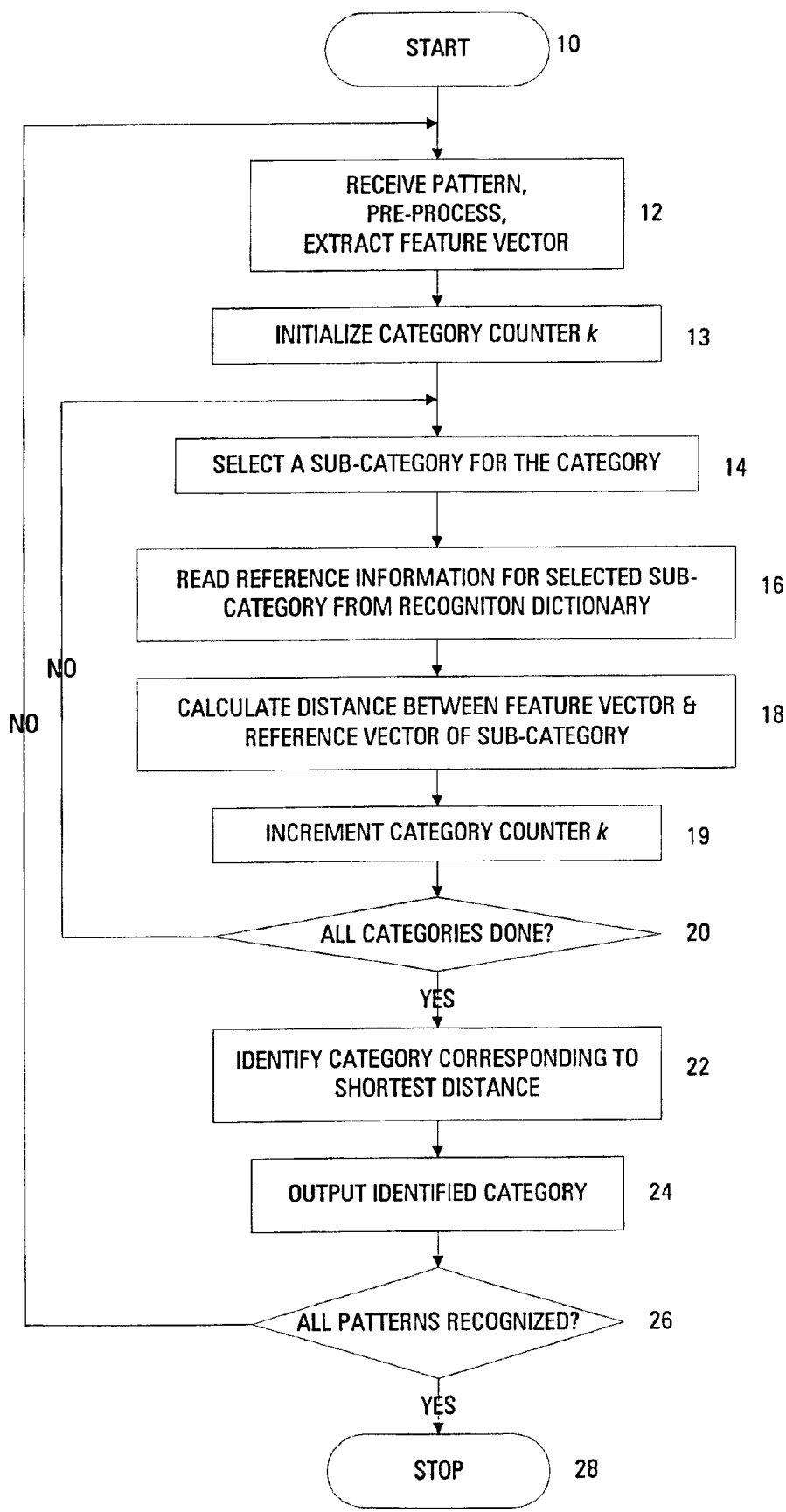
FIG. 3 is a flow chart illustrating the subcategory-level pattern recognition method according to the invention.

FIG. 3 is flow diagram of a preferred embodiment of the pattern recognition method according to the invention. The method may be used to recognize patterns that represent characters, for example, letters or numerals. The method may additionally or alternatively be used to recognize other types of patterns.

Processing begins at the start 10. At step 12, a pattern signal that represents an unknown pattern is received. The pattern signal is normally one of a set of pattern signals representing a set of unknown patterns. Although the pattern represented by the pattern signal is unknown, the unknown pattern is known to belong to a known pattern set for which a subcategory-level recognition dictionary is available. The recognition dictionary is divided into categories. Each of the categories corresponds to one of the patterns in the pattern set. Each of the categories is partitioned into a number of subcategories. The recognition dictionary stores reference information that includes a reference vector, a weighting vector and a constant for each of the subcategories.

The pattern signal is subject to preprocessing to normalize the size and orientation of the unknown pattern represented by the pattern signal and to remove noise, etc. Such preprocessing is conventional in pattern recognition, and so will not be further described here.

Feature values that represent the shape of the unknown pattern are extracted from the electronic pattern, and a feature vector that expresses these feature values is generated. Each feature represents a portion of the structure of the unknown pattern. Typical features may include the length of each stroke constituting the pattern, the angle of the stroke, and the number of loops. For example, when the pattern set is the numerals 0 through 9 and the feature is the number of loops in the pattern, the feature may have one of the following values:

0: when the electronic pattern represents the numeral "1", "2"or "3,"

1: when the electronic pattern represents the numeral "0", "6"or "9," and

2: when the electronic pattern represents the numeral "8."

Typically, many hundreds of feature values are extracted from each electronic pattern. The feature value of each of the features is represented by one element of the feature vector. The feature vector has a large number of dimensions, with 500 dimensions being typical.

At step 13, the category counter k is initialized.

At step 14, the subcategory of the category k that most closely matches the unknown pattern is selected. A method for selecting the subcategory will be described below with reference to FIG. 4. The subcategory selected is the subcategory that enables the pattern recognition method to recognize the unknown pattern with the highest accuracy.

At step 16, the reference information of the subcategory identified in step 14 is read from the recognition dictionary.

At step 18, the distance between the feature vector of the unknown pattern and the reference information read in step 16 is calculated. In the preferred embodiment, the distance is a modified Euclidian distance. However, other distances, such as the weighted Euclidian distance, may be used.

At step 19, the category counter k is incremented.

At step 20, a test is made to determine whether a distance has been calculated for all the categories in the recognition dictionary. If the test result is NO, execution returns to step 14, and steps 14, 16, 18 and 19 are repeated for the next category. If the test result is YES, execution passes to step 22.

At step 22, the category for which the distance calculated in step 18 is the least is identified.

At step 24, a code corresponding to the category identified in step 22 is output to indicate the category of the unknown pattern. For example, the ASCII code corresponding to the category may be output.

At step 26, a test is made to determine whether all the unknown patterns represented by all the input signals in the input signal set have been recognized. If the test result is NO, execution returns to step 12 so that another input signal representing another unknown pattern can be received. If the test result is YES, execution passes to step 28 where execution stops.

Figure 4:
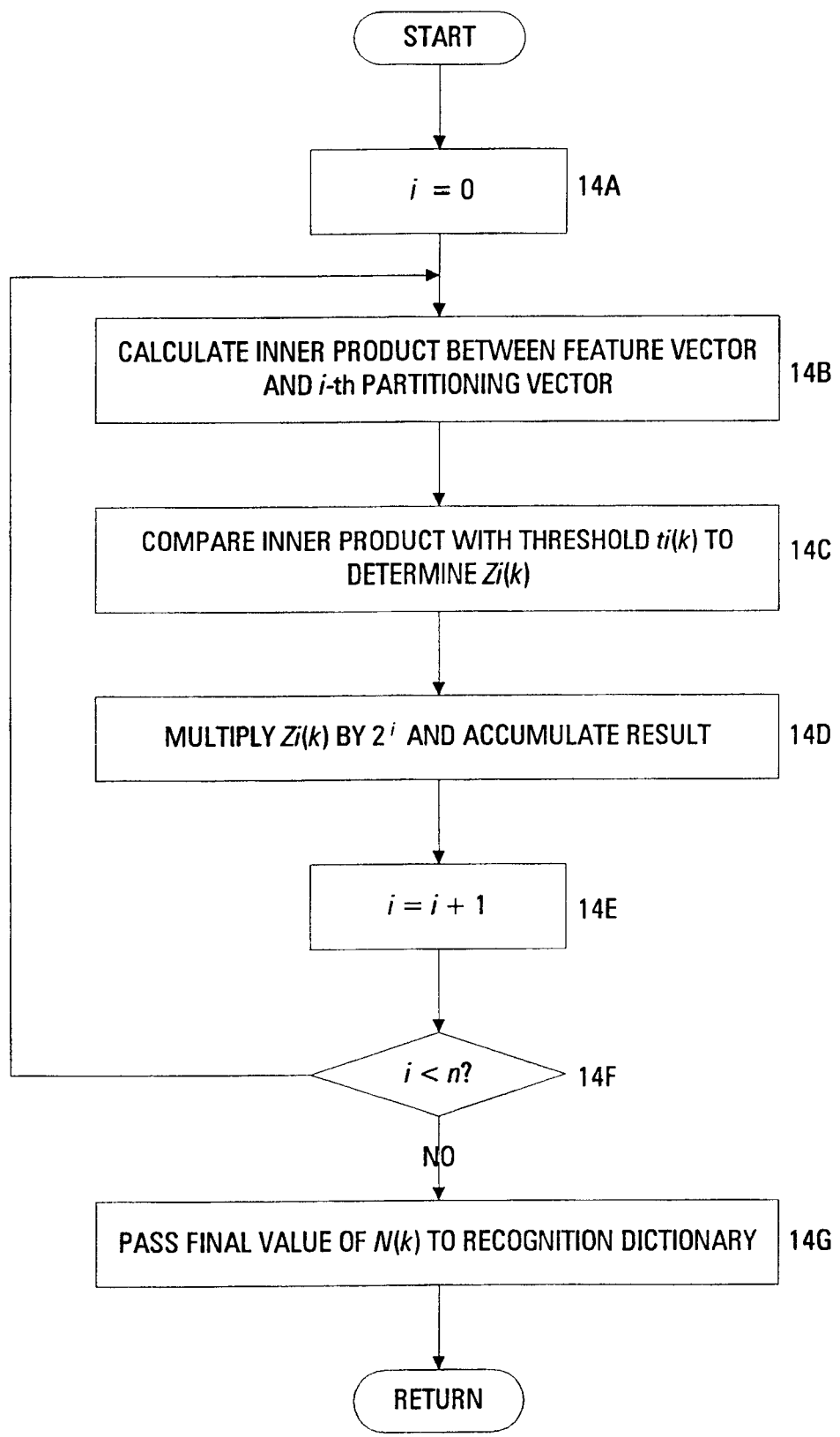
FIG. 4 is a flow chart showing details of the subcategory selection step of the pattern recognition method according to the invention.

An example of the processing performed in step 14 to select the subcategory that enables the pattern recognition method to recognize the unknown pattern with the greatest accuracy will now be described with reference to FIG. 4.

In step 14A, the index i is initialized to zero. The index i counts the number of partitioning vectors, and has values of 0, ..., n−1, where n is the number of partitioning vectors in the category k.

In step 14B, the inner product $y_i(k)$ between of the feature vector X of the unknown pattern and the i-th partitioning vector is calculated. The i-th partitioning vector of category k is $\Phi_i(k)$. Thus:

$$y_i(k)=X\Phi_i(k)$$

At step 14C, the inner product calculated in step 14B is compared to the predetermined threshold $t_i(k)$ to determine the variable $Z_i(k)$ as follows:

If $y_i(k)<t_i(k)$, $Z_i(k)=0$

If not, $Z_i(k)=1$.

The i-th threshold of the category k, $t_i(k)$, can be obtained by multiplying the mean vector m(k) of the category by the i-th partitioning vector $\Phi_i(k)$, i.e.:

$$t_i(k)=m(k)\Phi_i(k)$$

At step 14D, the i-th power of two is determined, the result is multiplied by $Z_i(k)$, and the resulting product is accumulated. Executing this step n times calculates the value of the index of the selected subcategory N(k) according to the equation:

$$N(k) = \sum_{i=0}^{n-1} Z_i(k) \cdot 2^i$$

At step 14E, the value of i is incremented by one.

At step 14F, a test is performed to determine whether inner products between the feature vector of the unknown pattern and all n partitioning vectors have been calculated by determining whether i is less than n. If the test result is YES, execution returns to step 14B so that the inner product between the feature vector of the unknown pattern and the next of the partitioning vectors can be calculated. If the test result is NO, execution passes to step 14G.

At step 14G, the final value of the index of the selected subcategory N(k) is passed to the recognition dictionary and execution return to the main routine.

The above-described pattern recognition method requires a subcategory-level recognition dictionary that has a reference vector, weighting vector and constant for each subcategory into which the categories are partitioned. The method also requires that the required number of partitioning vectors be defined for each category. Conventional recognition dictionaries generated by LDA only store a reference vector, weighting vector and constant for each category. A method according to the invention for constructing a subcategory-level recognition dictionary and for defining partitioning vectors for use in connection with the pattern recognition method according to the invention will be described next with reference to FIG. 5.

To generate the subcategory-level reference dictionary and the partitioning vectors, each category is partitioned into $2^n$ subcategories, and learning by discriminant analysis is applied to each subcategory to generate the reference information for the subcategory. In the process that will be described below, steps 54 and 56 effect partitioning, and steps 58, 62, 64, 68 and 70 apply learning by discriminant analysis to the subcategories. The remaining steps perform various housekeeping and control functions.

A set of training pattern signals is generated for each category into which the recognition dictionary is divided. Each training pattern signal in the set represents a training pattern that belongs to the category. The training patterns may represent characters such as letters or numerals or may additionally or alternatively be other kings of patterns.

Figure 5:
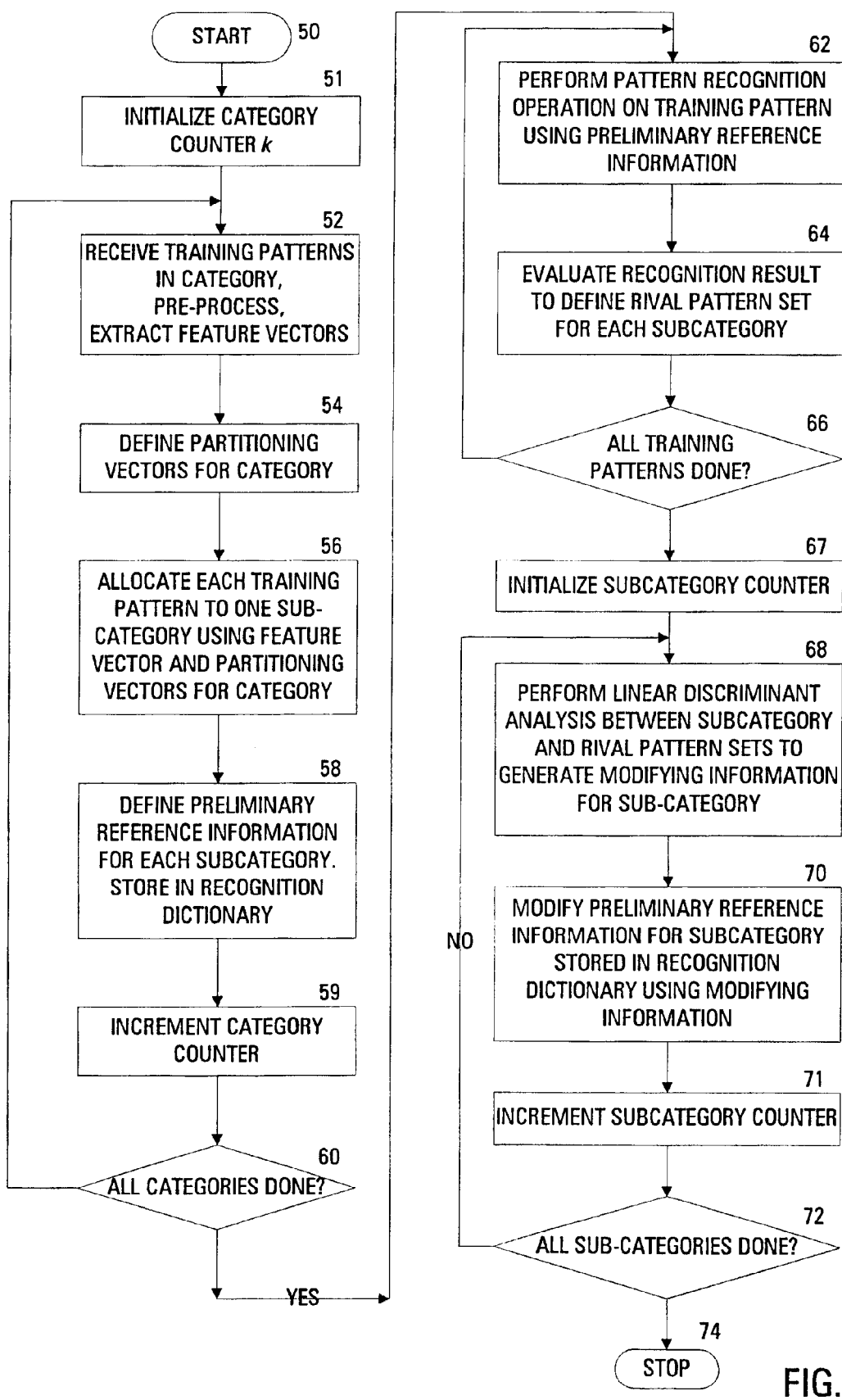
FIG. 5 is a flow chart illustrating the subcategory-level recognition dictionary generating method according to the invention.

The training pattern signals may be generated as follows, for example. Multiple writers are asked to write multiple examples of each pattern in the pattern set as training patterns. Each training pattern written by each writer is then converted into a training pattern signal that represents the training pattern. For example, the paper on which each writer writes the training patterns may be scanned, and the output of the scanner partitioned to provide a training pattern signal representing one training pattern. The training pattern signals that represent all the training patterns in each category are assembled and the processing illustrated in FIG. 5 is applied to each training pattern signal.

The processing starts at step 50.

At step 51, the category counter k is initialized

At step 52, each of the training pattern signals representing the training patterns in the category k is pre-processed and a feature vector representing the training pattern is extracted from the pre-processed training pattern signal. This processing is similar to that described above with reference to step 12 of FIG. 3, and is repeated until feature vectors for all the training patterns belonging to the category have been extracted.

At step 54, an input specifying $2^n$, the number of subcategories into which the categories are to be partitioned, is received, and n partitioning vectors is defined for the category k. Typically, the number of subcategories specified is two or four, which requires one or two partitioning vectors, respectively. In the following example, multiple partitioning vectors are assumed, but the same processing is applied when there is only one partitioning vector. The processing performed to define each of the partitioning vectors will be described in more detail below with reference to FIG. 6.

At step 56, each training pattern belonging to the category k is allocated to one of the subcategories into which the category is partitioned according to the relationship between the feature vector of the training pattern and the partitioning vectors of the category. The processing performed to make this allocation will be described in more detail below with reference to FIG. 7.

At step 58, preliminary reference information, including a preliminary reference vector and a preliminary weighting vector, is determined for each subcategory. In a preferred embodiment, an average vector is derived from the feature vectors of all the training patterns allocated to the subcategory in step 56 and the average vector is used as the preliminary reference vector for the subcategory. Each component of the weighting vector may be calculated by taking the inverse of the variance of the corresponding component of the feature vectors of all the training patterns allocated to the subcategory in step 56. The preliminary reference information is stored in the recognition dictionary in the appropriate location for the subcategory.

At step 59, the category counter k is incremented.

At step 60, the category counter is tested to determine whether preliminary reference information has been determined for all the categories. If the test result is NO, execution returns to step 52 where the set of training pattern signals representing the training patterns of the next category is received, pre-processed and feature vectors are extracted. If the test result is YES, and preliminary reference information has been determined for all the categories, execution advances to step 62.

At step 62, the preliminary reference information determined in the successive repetitions of step 58 is all read from the recognition dictionary and a subcategory-level pattern recognition operation is performed on each training pattern. The weighted Euclidian distance between the feature vector of the training pattern and the preliminary reference information of each subcategory is calculated. The training pattern is deemed to belong to the subcategory for which the weighted Euclidian distance is the least.

At step 64, a comparison is made between the subcategory to which the training pattern was allocated in step 56 and the subcategory determined by the pattern recognition operation performed in step 62 to check whether the pattern recognition operation has correctly determined that the training pattern belongs to the same subcategory as that to which the training pattern was allocated in step 56. The training patterns that the pattern recognition operation incorrectly determines as belonging to each subcategory are identified as belonging to the rival pattern set of the subcategory.

At step 66, a test is performed to determine whether all the training patterns have been subject to the pattern recognition operation. If the test result is NO, execution returns to step 62 so that more of the training patterns can be subject to the pattern recognition operation. If the test result is YES, all of the training patterns have been processed and the rival pattern sets of all of the subcategories have been defined. Consequently, execution advances to step 67.

At step 67, the subcategory counter k, i is initialized.

At step 68, a linear discriminant analysis operation is performed between the subcategory pattern set and the rival pattern set of the subcategory k, i. The subcategory pattern set is composed of the feature vectors of all the training patterns allocated to the subcategory k, i in step 56. The rival pattern set is composed of the feature vectors of the training patterns identified in step 64 as belonging to the rival pattern set of the subcategory. The processing by which the linear discriminant analysis is performed will be described in more detail below with reference to FIG. 8. The linear discriminant analysis generates modifying information that is used to modify the preliminary reference information for the subcategory.

At step 70, the preliminary reference information for the subcategory k, i is read from the recognition dictionary, modified using the modifying information generated in step 68, and the modified reference information is stored back in the recognition dictionary as the reference information for the subcategory.

At step 71, the subcategory counter k, i is incremented.

At step 72, the subcategory counter is tested to determine whether the linear discriminant analysis operation as been performed on all of the subcategories. If the test result is NO, execution returns to step 68 so that the linear discriminant analysis operation can be applied to the next subcategory. If the test result is YES, execution passes to step 74, where processing stops.

Figure 6:
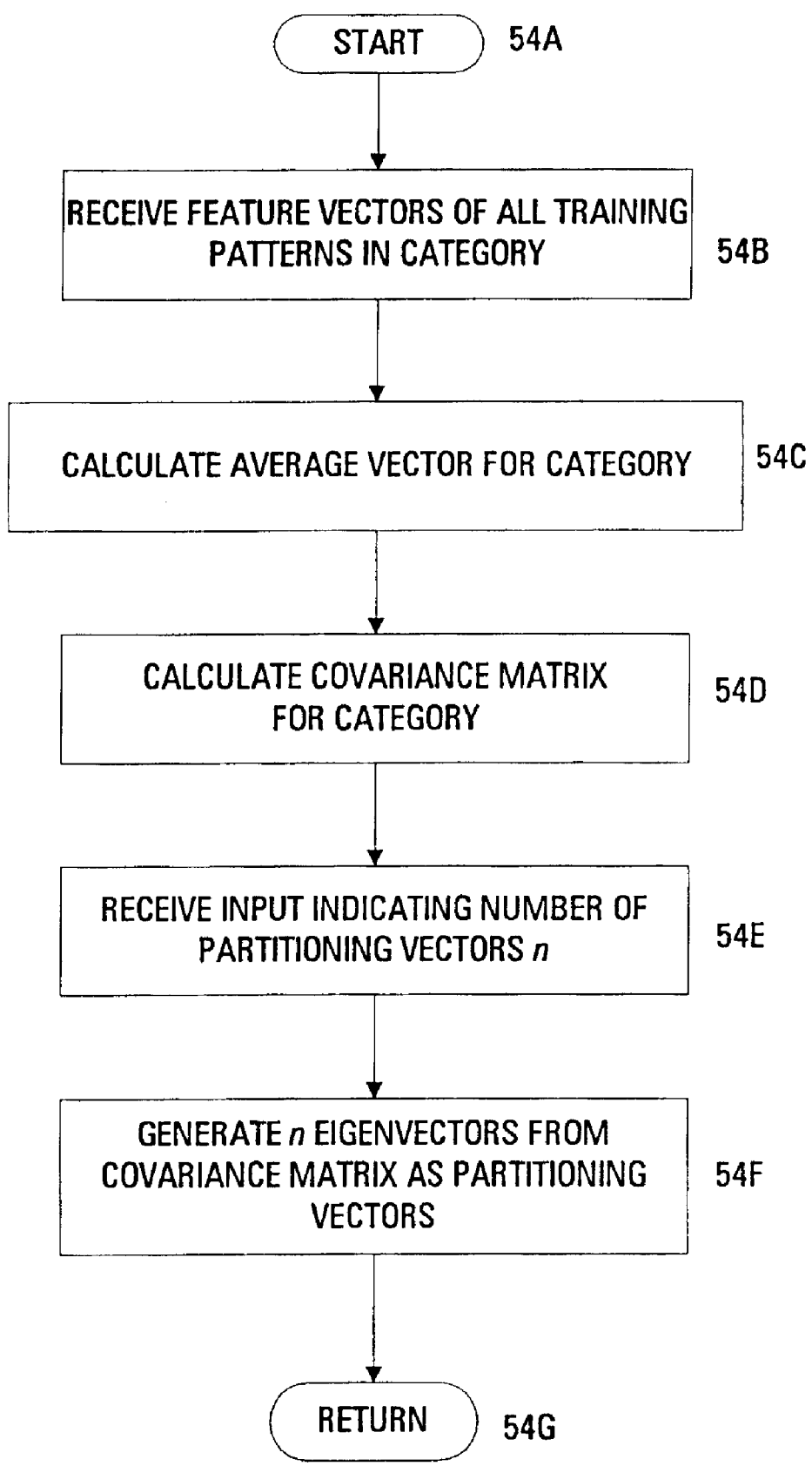
FIG. 6 is a flow chart illustrating the partitioning vector defining step of the recognition dictionary generating method according to the invention.

The processing performed in step 54 of FIG. 5 to define the partitioning vectors for the category will be described next with reference to FIG. 6. The processing starts at step 54A.

At step 54B, the feature vectors of all the training patterns in the category k are received.

At step 54C, an average vector is calculated from the feature vectors of all the training patterns received in step 54B.

If the feature vector of a training pattern in the category is expressed as:

$$x^{(h)} = (x_1^{(h)}, \ldots, x_m^{(h)}, \ldots, x_M^{(h)})$$

The average vector adopted as the reference vector may be expressed as:

$$\bar{x} = (\bar{x}_1, \ldots, \bar{x}_m, \ldots, \bar{x}_M)$$

At step 54D, the covariance matrix $S = (S_{pq})$ of the category is calculated from the average vector calculated in step 54C and from the feature vectors of the training patterns of the category using the following equation:

$$S_{pq} = \sum_{h=1}^{N} (x_p^{(h)} - \bar{x}_p)(x_q^{(h)} - \bar{x}_q)/(N-1)$$

where N is the number of training patterns of the category.

At step 54E, an input is received indicating the number of partitioning vectors to be generated. If the category is to be partitioned into $2^n$ subcategories, n partitioning vectors are required.

At step 54F, the n eigenvectors with the largest eigenvalues of the covariance matrix are derived for use as the n partitioning vectors.

At step 54G, processing returns to the main routine.

Figure 7:
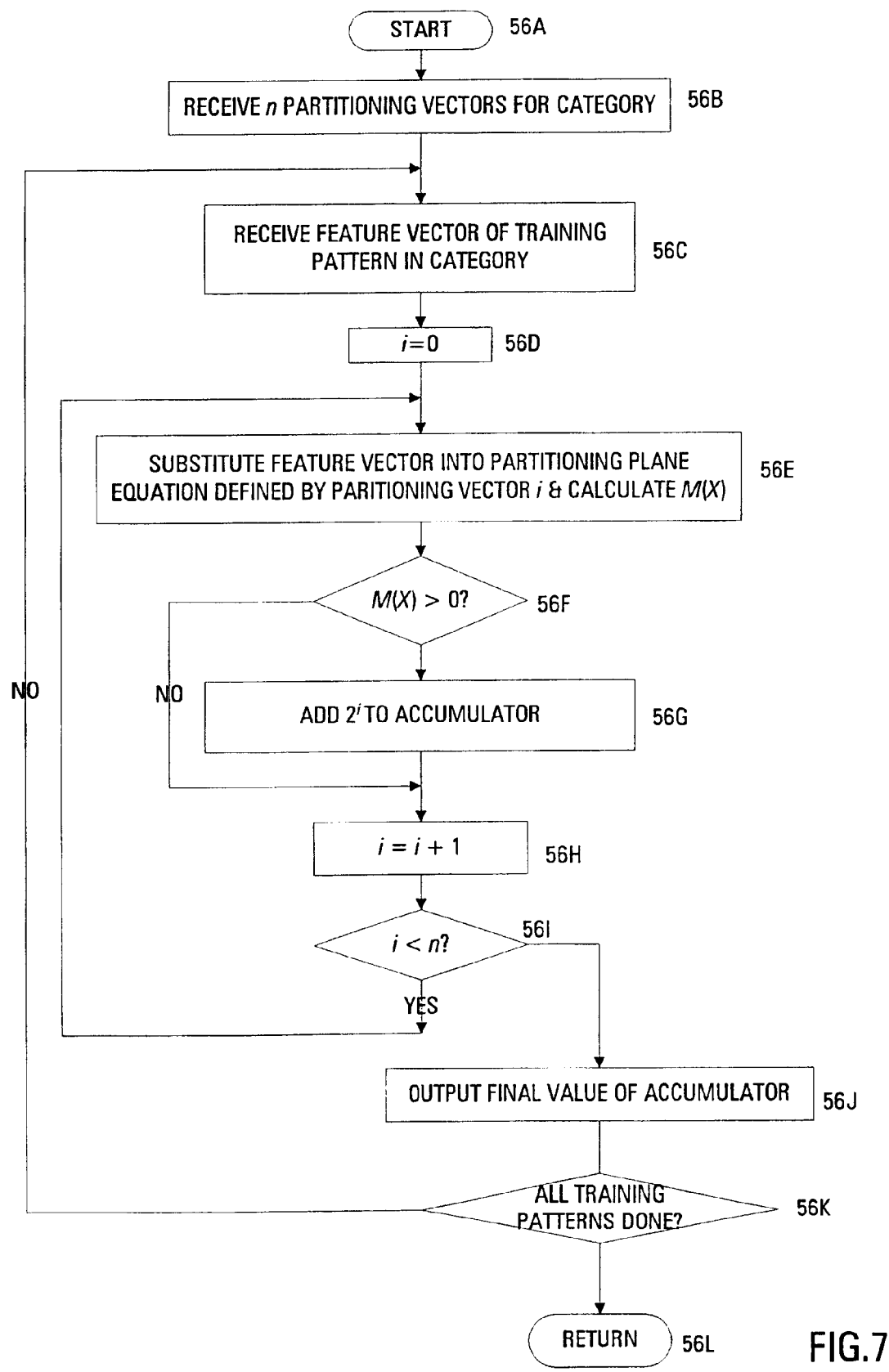
FIG. 7 is a flow chart illustrating the step in which training patterns are allocated to a subcategory in the recognition dictionary generating method according to the invention.

The processing performed in step 56 of FIG. 5 to determine the subcategory of the training patterns in each category will now be described with reference to FIG. 7. Processing starts at step 56A.

At step 56B, the n partitioning vectors for the category are received, and the equations of the corresponding partitioning planes are determined. The equation of the partitioning plane is of the form:

$$M(X) = a_1 x_1 + a_2 x_2 + a_3 x_3 + \ldots + a_h x^h - \text{const.}$$

At step 56C, the feature vector of a training pattern in the category is received At step 56D, the index i and the accumulator are both initialized to zero. The index i counts the number of partitioning vectors, and has values of $0, \ldots, n-1$, where n is the number of partitioning vectors in the category k.

At step 56E, the feature vector of the training pattern is substituted into the equation of the partitioning plane defined by the partitioning vector i of the category and the resulting value of $M(X)$ is calculated.

At step 56F, a test is performed to determine whether the value of $M(X)$ obtained in step 56E is positive. A positive value corresponds to the training pattern being located to the right of the partitioning plane. A negative value corresponds to the training pattern being located to the left of the partitioning plane. A value of zero corresponds to the training pattern being located on the partitioning plane.

If the test result is YES, execution passes to step 56G where the i-th power of two is calculated, or looked up in a table, and the result is added to the accumulator. Execution then passes to step 56H. If the test result is NO, executing skips step 56G and passes directly to step 56H.

At step 56H, the value of the index i is incremented by one.

At step 56I, a test is performed to determine whether the location of the feature vector of the training pattern relative to the partitioning planes defined by all n partitioning vectors has been determined by testing whether i is less than n. If the test result is YES, execution returns to step 56E so that the location of the training pattern relative to the partitioning plane defined by the next of the partitioning vectors can be determined. If the test result is NO, execution passes to step 56J.

At step 56J, the final value of the accumulator is output as the index of the subcategory to which the training pattern has been allocated.

At step 56K, a test is performed to determine whether all the training patterns in the category have been allocated to subcategories. If the test result is NO, execution returns to step 56C so that the subcategory of another training pattern can be determined. If the test result is YES, execution advances to step 56L where execution returns to the main routine. In step 68 of FIG. 5, a linear discriminant analysis operation is performed between the subcategory pattern set and the rival pattern set of each subcategory. The weighted Euclidean distance D(x) between the feature vector of a pattern and the reference vector of each subcategory can be described as follows:

$$D(x) = \sum_{m=1}^{M} \omega_m (x_m - \mu_m)^2$$

where $x=(x_1, \ldots, x_M)^t$ represents the feature vector of the pattern $\mu=(\mu_1, \ldots, \mu_M)^t$ represents the reference vector of the subcategory, and $\omega=(\omega_1, \ldots, \omega_M)^t$ represents the weighting vector, and t denotes transpose.

Subscripts denoting the index of the subcategory have been omitted from the equation to simplify it.

To obtain the discriminant function F(x), the processing described above with reference to FIG. 5 first performs a pattern recognition operation on the training patterns at step 62. Each training pattern is determined to belong to the subcategory for which the value of D(x) is lowest. Then, at step 64, the results of the pattern recognition operation are analyzed to identify, for each subcategory, the training patterns that are incorrectly recognized as belonging to the subcategory. The training patterns that are incorrectly recognized as belonging to the subcategory constitute the rival pattern set for the subcategory. The training patterns that were allocated to the subcategory in step 56 constitute the subcategory pattern set for the subcategory. For example, training pattern x is defined as belonging to subcategory 2 of category A because (a) the writer who wrote training pattern x did so in response to a request to write a pattern that belongs to category A, and (b) the training pattern x was allocated to subcategory 2 of category A in step 56. Membership of the training pattern in the subcategory pattern set is independent of the recognition result of the pattern recognition operation.

Once the subcategory pattern set of each subcategory and its corresponding rival pattern set have been determined, a linear discriminant analysis is performed between the subcategory pattern set and the rival pattern set of the subcategory at step 68. The linear discriminant analysis uses a 2M-dimensional vector y whose components are defined as:

$Y_m = (x_m - \mu_m)^2$ $Y_{M+m} = (x_m - \mu_m)$

The discriminant function F(x) can be written as follows:

$$F(x) = \sum_{m=1}^{M} a_m y_m + \sum_{m=1}^{M} b_m y_{M+m} + c$$

$$= \sum_{m=1}^{M} a_m (x_m - \mu_m)^2 + \sum_{m=1}^{M} b_m (x_m - \mu_m) + c$$

It can be seen that the second form of F(x) is a quadratic equation of the form $ax^2+bx+c$.

The constant c always has a negative value. The way in which the coefficients $a_m$ and $b_m$ are determined will be described below.

The discriminant function F(x) is less than zero when the training pattern belongs to the subcategory pattern set, and F(x) is greater than zero when the training pattern belongs to the rival pattern set.

The modified Euclidian distance G(x) is defined as:

$G(x) = D(x) + yF(x)$ where y is a positive coefficient whose value is determined experimentally to maximize the recognition ratio when pattern recognition is performed using the modified Euclidian distance G(x).

By adding yF(x) to D(x), the original weighted Euclidian distance is modified in such a manner that the distance between the feature vector of the pattern and the reference vector of the subcategory to which the pattern belongs is reduced, and the distance between the feature vector of the pattern and the reference vectors of the subcategories to which the pattern does not belong is increased. This enables a pattern that was incorrectly recognized when the original weighted Euclidian distance D(x) was used to be recognized correctly when the modified Euclidian distance G(x) is used.

G(x) can be written as:

$$G(x) = \sum_{m=1}^{M} \omega'_m (x_m - \mu'_m)^2 + d$$

$$= \sum_{m=1}^{M} (\omega_m + \Delta\omega_m)(x_m - (\mu_m + \Delta\mu_m))^2 + d$$

where:

$\Delta\omega_m = ya_m$ $\Delta\mu_m = -yb_m/2(\omega_m + \Delta\omega_m)$ $\approx -yb_m/(2\omega_m)$ $d = yc + \sum_{m=1}^{M} d_m$, and $d_m = -\left(\frac{1}{4}\right)\sum_{m=1}^{M} (yb_m)^2/(\omega_m + \Delta\omega_m)$ The form of the modified Euclidian distance function G(x) is the same as that of the original weighted Euclidian distance function D(x), except for the addition of the constant term d, and the m-th components of the reference vector and the weighting vector being modified by $\Delta\mu_m$ and $\Delta\omega_m$, respectively. This means that the parameters of the distance function can be learned using the rival pattern set for the category. The modified reference vectors, weighting vectors, and constant terms are stored in the recognition dictionary as the reference information of the subcategory when determining G(x).

The quadratic coefficients $a_m$, $b_m$ and c that define F(x) are determined as follows. A vector a is defined as:

$a = (a_1, \ldots, a_M, b_1, \ldots, b_M)^t$ $a = \Sigma^{-1}(\mu_R - \mu_N)$ $c = a^t(\mu_R + \mu_N)/2$ where:

$\Sigma$ is the subcategory covariance matrix for the vector y, $\mu_N$ the average feature vector of the subcategory pattern set, i.e., the preliminary reference vector of the subcategory, and $\mu_R$ is the average feature vector of the rival pattern set of the subcategory, The following is an example of the way in which $\Sigma$ may be defined:

$$\Sigma = \{(n_s-1)S_s + (n_R-1)S_R\}/(n_s+n_R-2)$$

where:

$S_s$ is the covariance matrix of the subcategory pattern set, $S_R$ is the covariance matrix of the rival pattern set of the subcategory, $n_s$ is the number of training patterns in the subcategory pattern set, and $n_R$ is the number of training patterns in the rival pattern set of the subcategory.

Once values for the quadratic coefficients $a_m$, $b_m$ and c of F(x) have been calculated, the value of F(x) can then be calculated for each subcategory.

The optimum value of y is determined by performing successive pattern recognition operations on the training patterns in the training pattern set using D(x), F(x) and a different value of y, and determining the recognition ratio of each pattern recognition operation. The optimum value of y is that which gives the greatest recognition ratio.

Figure 8:
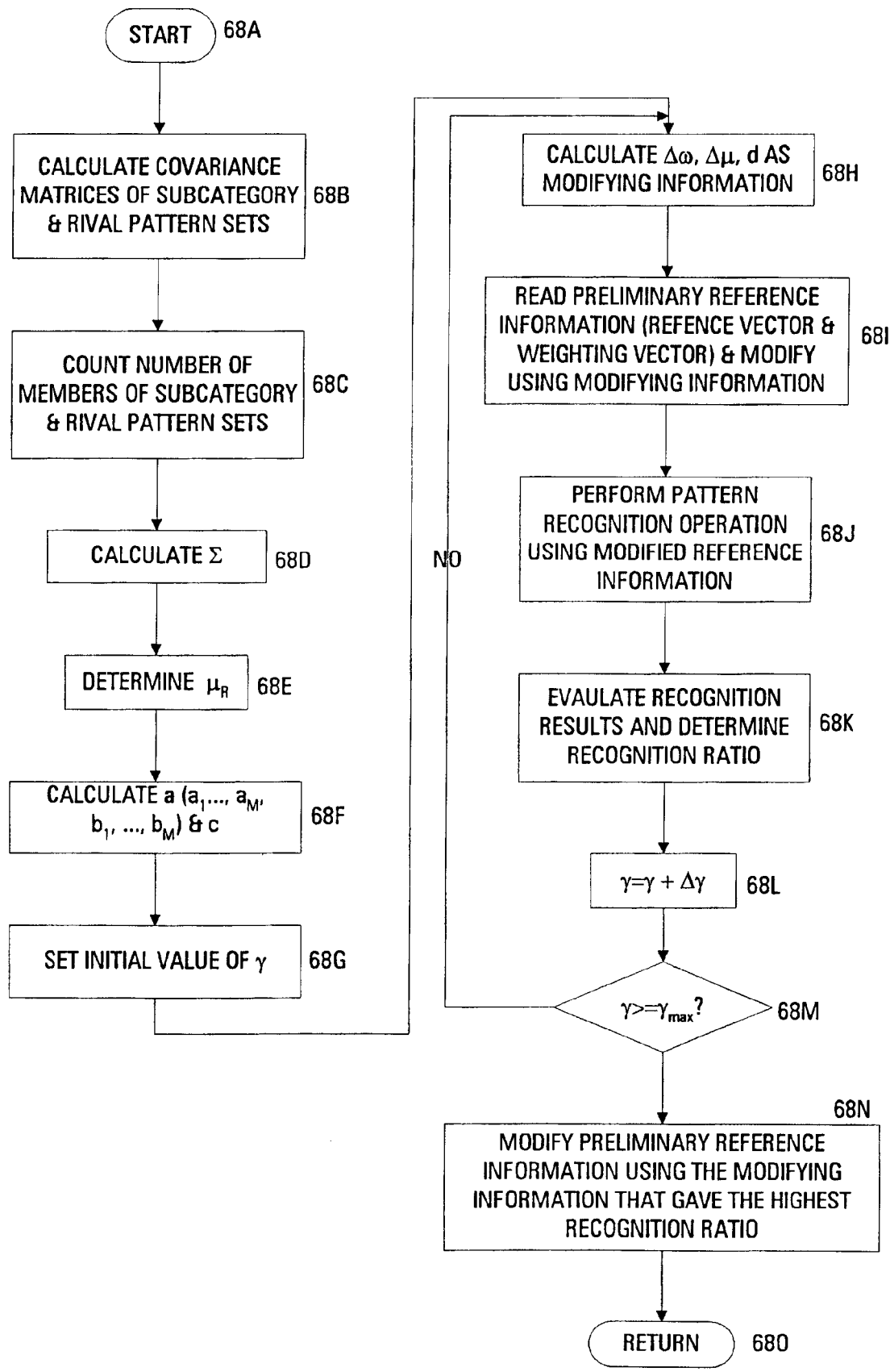
FIG. 8 is a flow chart illustrating the linear discriminant analysis step of the recognition dictionary generating method according to the invention.

Processing that may be used to perform the linear discriminant analysis of a subcategory will now be described with reference to FIG. 8. Execution starts at step 68A.

At step 68B, the covariance matrix $S_s$ of the subcategory pattern set of the subcategory and the covariance matrix $S_R$ of the corresponding rival pattern set are calculated.

At step 68C, the number of training patterns $n_s$ in the subcategory pattern set of the subcategory and number of training patterns $n_R$ in the corresponding rival pattern set are counted.

At step 68D, the value of $\Sigma$ is calculated from $S_s$, $S_R$, $n_s$ and $n_R$ according to the equation:

$$\Sigma = \{(n_s-1)S_s + (n_R-1)S_R\}/(n_s+n_R-2).$$

At step 68E, the average feature vector $\mu_R$, of the rival pattern set is determined.

At step 68F, the quadratic coefficients $a_m$, $b_m$ and c (m=1, ..., M) that define F(x) are determined from $\Sigma$ calculated in step 68D, the reference vector of the subcategory $\mu_s$ determined in step 58, and $\mu_R$ determined in step 68E. The quadratic coefficients $a_1, \ldots, a_M$ and $b_1, \ldots, b_M$ are represented by the vector a.

The vector a is determined using the equation:

$$a = \Sigma^{-1}(\mu_R - \mu_N).$$

The constant c is determined from:

$$c = a^t(\mu_R + \mu_N)/2.$$

At step 68G, the value of y is initialized.

At step 68H, values of $\Delta\omega$, $\Delta\mu$ and d are calculated from the values of a and c calculated in step 68F, the value of y set in step 68G, and the weighting vector $\omega$ determined in step 58.

$$\Delta\omega_m = ya_m$$

$$\Delta\mu_m = -yb_m/2(\omega_m + \Delta\omega_m), \text{ and}$$

-continued $$d = yc + \sum_{m=1}^{M}\left(-\frac{1}{4} + \sum_{m=1}^{M}(yb_m)^2/(\omega_m + \Delta\omega_m)\right)$$

The values of y, $\Delta\omega$, $\Delta\mu$ and d are temporarily stored as modifying information. When this step is repeated on a subsequent iteration, the modifying information stored in earlier iterations is not overwritten.

At step 68I, the preliminary reference information for the subcategory defined at step 58 is read from the recognition dictionary and is modified using the modifying information calculated in step 68H. $\Delta\mu$ is added to the preliminary reference vector $\mu$ and $\Delta\omega$ to the preliminary weighting vector $\omega$. In addition, the constant d is included as an additional component of the reference information.

At step 68J, a pattern recognition operation is performed on the training patterns using the reference information modified in step 68I to determine the subcategory of each training pattern.

At step 68K, the results of the pattern recognition operation are evaluated against the subcategories to which the training patterns were allocated in step 56. In addition to determining whether each training pattern has been correctly recognized as belonging to its respective subcategory, the overall recognition ratio of the pattern recognition operation is determined and temporarily stored together with the values of the modifying information generated at step 68H.

At step 68L, the value of y is incremented by $\Delta y$.

At step 68M, a test is performed to determine whether the value of y is greater than or equal to the maximum value $Y_{max}$. If the test result is NO, execution returns to step 68H to allow new values of $\Delta\omega$, $\Delta\mu$ and d to be calculated using the new value of y. If the test result is YES, execution advances to step 68N.

At step 68N, the recognition ratios temporarily stored in the successive iterations of step 68K are examined to determine the highest recognition ratio, the values of the modifying information, $\Delta\omega$, $\Delta\mu$ and d, corresponding to the highest overall recognition ratio are read out, and the preliminary recognition information stored in the recognition dictionary for the subcategory is modified using the modifying information.

At step 68O, execution returns to the main routine.

Figure 9:
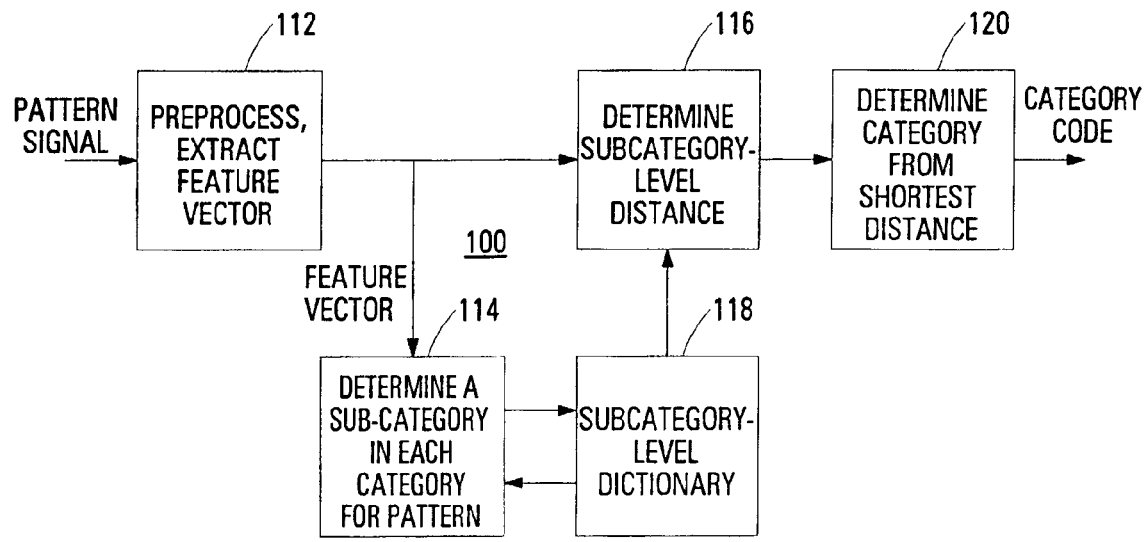
FIG. 9 is a block diagram of a subcategory-level pattern recognition apparatus according to the invention.

FIG. 9 shows an embodiment 100 of a pattern recognition apparatus according to the invention based on a subcategory-level recognition dictionary. The apparatus may be used to recognize patterns that represent characters such as letters or numerals. Additionally or alternatively, the apparatus may be used to recognize other kinds of patterns The pattern recognition apparatus is composed of the preprocessing module 112, the subcategory determining module 114, the distance determining module 116, the subcategory-level recognition dictionary 118, and the category determining module 120.

In the pattern recognition apparatus 100, the preprocessing module 112 receives a pattern signal that represents an unknown pattern. The pattern signal is normally one of a set of pattern signals representing a set of unknown patterns. Although the pattern represented by the pattern signal is unknown, the unknown pattern is known to belong to the pattern set for which the subcategory-level recognition dictionary 118 stores reference information. The recognition dictionary is divided into categories. Each of the categories corresponds to one of the patterns in the pattern set. Each of the categories is partitioned into a number of subcategories. The reference information stored in the recognition dictionary includes a reference vector, a weighting vector and a constant for each of the subcategories.

The preprocessing module 112 processes the pattern signal to normalize the size and orientation of the unknown pattern represented by the signal, and to remove noise, etc. Such pre-processing is conventional in pattern recognition, and so will not be further described here. The preprocessing module also extracts from the pattern signal feature values that represent the shape of the pattern represented by the pattern signal and generates a feature vector that represents these feature values. The feature vector has a large number of dimensions, with 500 dimensions being typical.

The preprocessing module 112 has an output connected to the inputs of the subcategory determining module 114 and the distance determining module 116. The preprocessing module feeds the feature vector extracted from the pattern signal to the subcategory determining module and the distance determining module via these connections.

The subcategory determining module 114 has a second input connected to one output of the recognition dictionary 118. The subcategory determining module receives at least one partition vector and threshold for each category from the recognition dictionary through this connection. The subcategory determining module has an output connected to an input of the recognition dictionary through which the subcategory determining module feeds subcategory information to the recognition dictionary.

The number of partitioning vectors stored in the recognition dictionary 118 for each category depends on the number of subcategories into which the category is divided, as described above. To simplify the following description, it will be assumed that each category is divided into more than two subcategories, which requires more than one partitioning vector. If each category is divided into two subcategories, only a single partitioning vector is required.

Using the partitioning vectors and thresholds for each category received from the recognition dictionary 118, the subcategory determining module 114 determines the subcategory of each category to which the unknown pattern represented by the feature vector received from the preprocessing module 112 belongs and generates subcategory information indicating this subcategory. The subcategory information includes a data element for each category for which recognition information is stored in the recognition dictionary 118. The data element indicates the subcategory of that category to which the unknown pattern is determined to belong.

The subcategory determining module 114 has an output connected to an input of the recognition dictionary through which the subcategory determining module feeds the subcategory information to the recognition dictionary. The subcategory determining module will be described in more detail below with reference to FIG. 10.

For each category, the recognition dictionary 118 selects the reference information of the subcategory indicated by the subcategory information. For example, if the subcategory information of the categories 0 and 1 indicate that the unknown pattern belongs to subcategory 2 of category 0 and subcategory 3 of category 1, the recognition dictionary will select the reference information of subcategory 2 of category 0 and that of subcategory 3 of category 1.

The recognition dictionary 118 has a second output connected to a second input of the distance determining module 116 through which the recognition dictionary feeds the selected reference information for each category to the distance determining module. The distance determining module determines the distance between the feature vector of the unknown pattern and the reference information for each category received from the recognition dictionary. For each category, the reference information is the reference information for the subcategory indicated by the subcategory information generated by the subcategory determining module 114. In a preferred embodiment, the distance determined is a modified Euclidian distance.

The distance determining module 116 has an output connected to the input of the category determining module 120 through which the distance determining module feeds the modified Euclidian distance for each category to the category determining module. The category determining module identifies the category having the smallest distance and generates a code corresponding to that category as the recognition result for the unknown pattern. The code may be the ASCII code, for example, corresponding to the category having the smallest distance.

The pattern recognition apparatus 100 may be constructed from discrete components, small-scale or large-scale integrated circuits, suitably-configured ASIC and other suitable hardware. Alternatively, the apparatus may be constructed by using a suitably-programmed digital signal processor, microprocessor or microcomputer with internal or external memory. In computer- and DSP-based embodiments, the modules shown in FIG. 9 may be ephemeral, and may only exist temporarily as the program executes.

Figure 10:
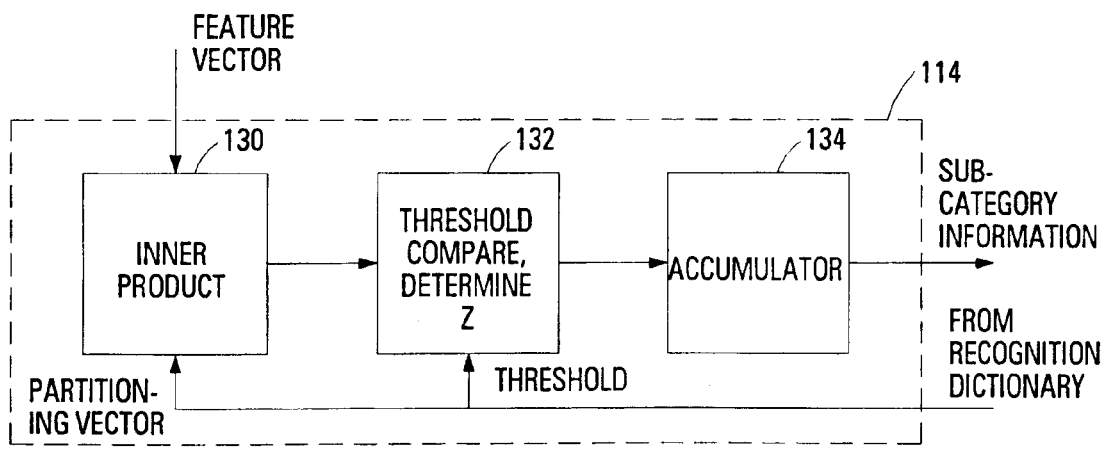
FIG. 10 is a block diagram showing details of the subcategory determining module of the pattern recognition method according to the invention.

Details of an example of the subcategory determining module 114 are shown in FIG. 10. In this example, the subcategory determining module is composed of the inner product calculating module 130, the threshold comparing module 132 and the accumulator 134. The subcategory determines the subcategory of each category to which the unknown pattern belongs. The inner product calculating module has a first input through which it receives the partition vectors for each category from the recognition dictionary 118 and a second input through which it receives the feature vector of the unknown pattern.

The inner product calculating module 130 has an output connected to one input of the threshold comparing module 132. The threshold comparing module has another input through which it receives threshold data from the recognition dictionary 118. The threshold comparing module has an output connected to the input of the accumulator 134. The accumulator has an output connected to the input of the recognition dictionary.

The inner product calculating module 130 calculates an inner product between the feature vector of the unknown pattern received from the preprocessing module 112 and each partitioning vector of the category received from the recognition dictionary 118, i.e., $$y_i(k) = X \cdot \phi_i(k)$$

where: X is the feature vector of the unknown pattern,
$\phi_i(k)$ is the i-th partitioning vector of category k, and
$y_i(k)$ is the inner product.

The threshold comparing module 132 compares each inner product $y_i(k)$ calculated by the inner product calculating module 130 for the category k with the threshold $t_i(k)$ to determine the variable $Z_i(k)$ as follows:

If $y_i(k) < t_i(k)$, $Z_i(k) = 0$

Otherwise, $Z_i(k) = 1$.

The i-th threshold of the category k, $t_i(k)$, can be obtained by multiplying the mean vector m(k) of the category k by the i-th partitioning vector $\phi_i(k)$, i.e.:

$t_i(k)=m(k)\phi_i(k)$.

The threshold comparing module feeds the values of $Z_i(k)$ to the accumulator 134.

For each value of i between 0 and n-1, where n is the number of partitioning vectors, the accumulator 134 multiplies the i-th power of two by $Zi(k)$, and accumulates the resulting product. The accumulator may calculate the i-th power of two or may look up the i-th power of two in a table. As an alternative to multiplying the i-th power of two by $Z_i(k)$, the accumulator may accumulate the i-th power of two only if $Z_i(k)=1$. The processing performed by the accumulator calculates the index of the selected subcategory according to the equation:

$$N(k) = \sum_{i=0}^{n-1} Z_i(k) \cdot 2^i$$

The accumulator 134 feeds the value of N(k), the subcategory index for the category, for the category to the recognition dictionary 118. The above processing structure is re-used to calculate a subcategory index for each of the remaining categories for the unknown pattern, and is further re-used to calculate a subcategory index for each category for each unknown pattern for which a pattern signal is received.

Figure 11:
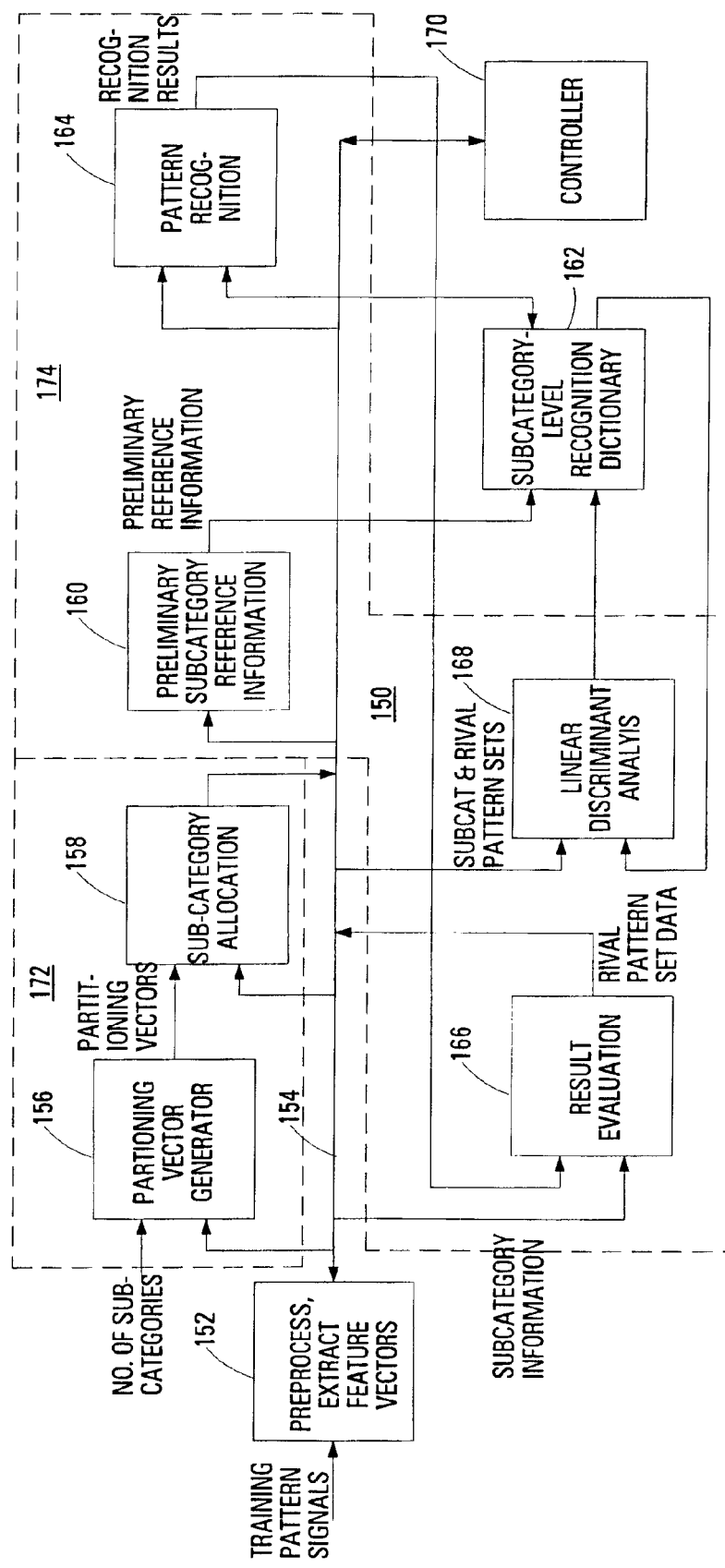
FIG. 11 is a block diagram of a subcategory-level recognition dictionary generating apparatus according to the invention.

The embodiment of the pattern recognition apparatus shown in FIG. 9 includes a subcategory-level recognition dictionary that stores reference information for each of the number of subcategories into which each category is partitioned. FIG. 11 shows an embodiment of a recognition dictionary generating apparatus according to the invention. The apparatus generates a subcategory-level recognition dictionary for use in the pattern recognition apparatus according to the invention. The apparatus may be used to generate a recognition dictionary for use in recognizing patterns that represent characters such as letters or numerals. Additionally or alternatively, the apparatus may be used to generate a recognition dictionary for use in recognizing other types of patterns.

The recognition dictionary generating apparatus 150 is composed of two main sections, the partitioning section 172 and the learning by discriminant analysis section 174. The partitioning section is composed of the partitioning vector generator 156 and the subcategory allocation module 158, and partitions each category into a predetermined number of subcategories. The learning by discriminant analysis section is composed of the initial reference information generating module 160, the pattern recognition module 164, the result evaluation module 166 and the linear discriminant analysis module 168 and applies learning by discriminant analysis to each subcategory to generate the reference information for the subcategory.

In the recognition dictionary generating apparatus 150, the preprocessing module 152 receives a set of training pattern signals for each category into which the recognition dictionary is divided. Each training pattern signal in the set represents a training pattern that belongs to the category. For example, the training pattern signals may be generated as follows. Multiple writers are asked to write multiple examples of each pattern in the pattern set as training patterns. Each training pattern written by each writer is then converted into a training pattern signal. For example, the paper on which each writer writes the training patterns may be scanned, and the output signal generated by the scanner partitioned to provide a training pattern signal representing each training pattern. The training pattern signals derived from training patterns are grouped into sets corresponding to each category into which the recognition dictionary is divided and are preferably fed into the preprocessing module 152 in category order.

The preprocessing module 152 is substantially similar to the preprocessing module 112 described above with reference to FIG. 9 and so will not be described again here. The preprocessing module 152 stores the feature vector of each of the training patterns together with information indicating the category of the training pattern.

The preprocessing module 152 is connected to the bus 154. The bus 154 provides a path though which feature vectors and respective subcategory information can be exchanged between the modules constituting the recognition dictionary generating apparatus 150 and through which the control module 170 can feed instructions to the modules.

The partitioning vector generator 156 has an input connected to the bus 154. In response to a command from the controller 170, the preprocessing module 152 feeds the feature vectors for all the training patterns in each category to the partitioning vector generator via the bus. The partitioning vector generator has a second input through which it receives an input indicating the number of subcategories into which the categories are to be partitioned. This input indicates the number of partitioning vectors that the partitioning vector generator is to generate for each category. All the categories are normally partitioned into the same number of subcategories, so the partitioning vector normally generates the same number of partitioning vectors for all the categories. The partitioning vector generator generates the indicated number of partitioning vectors for each category from the feature vectors of the training patterns in the category.

The partitioning vector generator 156 passes the partitioning vectors it generates for each category to the subcategory allocation module 158. The subcategory allocation module has a second input connected to the bus 154. In response to a command from the controller 170, the preprocessing module 152 feeds the feature vectors of all the training patterns in the category to the subcategory allocation module via the bus. The subcategory allocation module allocates each training pattern to one subcategory of the category in accordance with the relationship between the feature vector of the training pattern and the partitioning vectors of the category.

The subcategory allocation module 158 has an output connected to the bus 154. In response to a command from the controller 170, the subcategory allocation module feeds subcategory information indicating the subcategory of each training pattern in the category to the bus 154. The preprocessing module 152, the result evaluation module 166 and the preliminary reference information determining module 160 have inputs connected to the bus through which these modules receive the subcategory information. The preprocessing module 152 stores the subcategory information of each feature vector so that the subcategory information is linked to the feature vector.

The preliminary reference information determining module 160 has an input connected to the bus 154. In response to a command from the controller 170, the preprocessing module 152 feeds the feature vectors of all the training patterns having the same subcategory information, i.e., all the training patterns in each subcategory, to the preliminary reference information determining module. The preliminary reference information determining module determines preliminary reference information for each subcategory. For example, the preliminary reference information determining module may calculate an average vector from the feature vectors of all the training patterns in the subcategory as the preliminary reference vector of the subcategory. The preliminary reference information determining module may also calculate a preliminary weighting vector for the subcategory from the feature vectors of the training patterns in the subcategory. The preliminary reference information determining module has an output connected to an input of the subcategory-level recognition dictionary 162. The preliminary reference information determining module passes the preliminary reference information to the recognition dictionary through this connection. The preliminary reference information determining module processes the feature vectors belonging to the subcategories until preliminary reference information for all the subcategories has been stored in the recognition dictionary.

The pattern recognition module 164 has an input that receives the preliminary reference information for each subcategory from the recognition dictionary 162. The pattern recognition module has a second input connected to the bus 154. In response to a command from the controller 170, the preprocessing module feeds the feature vectors of all the training patterns to the pattern recognition module through the bus 154. The pattern recognition module performs a pattern recognition operation on each feature vector to determine the subcategory to which the corresponding training pattern belongs. The pattern recognition operation is performed by determining the weighted Euclidian distance between the feature vector and the preliminary reference information of each subcategory. The training pattern is deemed to belong to the subcategory for which the weighted Euclidian distance is the least. The pattern recognition module 164 has an output through which it passes the recognition result for each training pattern to an input of the result evaluation module 166.

The result evaluation module 166 has a second input connected to the bus 154. The controller 170 causes the preprocessing module 152 to feed the subcategory data corresponding to the training pattern whose pattern recognition result is generated by the pattern recognition module 164 to the result evaluation module. The result evaluation module compares the recognition result for the training pattern with the subcategory data for the training pattern to determine whether the pattern recognition module has incorrectly determined the subcategory to which the training pattern belongs. The result evaluation module has an output connected to the bus 154 through which it passes to the preprocessing module 152 information identifying the training patterns that are incorrectly recognized as belonging to each subcategory, i.e., the training patterns that belong to the rival pattern set of the subcategory.

The linear discriminant analysis module 168 has an input connected to the bus 154 through which it receives feature vectors from the preprocessing module 152. In response to the controller 170, the preprocessing module feeds to the linear discriminant analysis module the feature vectors of all the training patterns that belong to each subcategory (the subcategory pattern set) and the feature vectors of all the training patterns that are identified by the result evaluation module 166 as having been incorrectly recognized by the pattern recognition module 164 as belonging to the subcategory (the rival pattern set). The linear discriminant analysis module has a second input through which it receives reference information from the recognition dictionary 162. The linear discriminant analysis module performs a linear discriminant analysis operation between the subcategory pattern set and the rival pattern set of each subcategory to generate modified reference information for the subcategory.

The linear discriminant analysis module passes the modified reference information generated for each subcategory to the recognition dictionary 162 where the modified reference information is stored as the reference information for the subcategory. This reference information is then ready for use in recognizing unknown patterns.

The linear discriminant analysis module 168 performs the linear discriminant analysis iteratively to generate modified reference information that provides the highest recognition ratio. The linear discriminant analysis module performs this optimization in cooperation with the pattern recognition module 164, recognition result evaluation module 166 and the recognition dictionary 162.

The subcategory-level recognition dictionary generating apparatus 150 may be constructed from discrete components, small-scale or large-scale integrated circuits, suitably-configured ASIC and other suitable hardware. Alternatively, the apparatus may be constructed by using a suitably-programmed digital signal processor, microprocessor or microcomputer with internal or external memory. In computer- and DSP-based embodiments, the modules shown in FIG. 11 may be ephemeral, and may only exist temporarily as the program executes. The recognition dictionary include a removable non-volatile memory to enable the recognition dictionary to be transferred from the recognition dictionary generating apparatus 150 to the pattern recognition apparatus 100. Alternatively, the reference information stored in the recognition dictionary 162 may be transferred to the recognition dictionary 118 shown in FIG. 9 by a suitable communication link.

The apparatus and method of the invention provide a high recognition ratio, even when the categories have an asymmetric distribution in feature space. The apparatus and method of the invention were compared with a conventional LDA-based pattern recognition system using training patterns. The recognition ratio of the conventional LDA-based pattern recognition method was 99.71%, corresponding to a mis-recognition ratio of 0.29%. In contrast, the subcategory-based pattern recognition method according to the invention gave a recognition ratio of 99.86% when each category was partitioned into four subcategories, i.e., when n=2. This corresponds to a mis-recognition ratio of 0.14%. Thus, the subcategory-based pattern recognition method of the invention had a mis-recognition ration of less than half of that of the conventional method.

Although this disclosure describes illustrative embodiments of the invention in detail, it is to be understood that the invention is not limited to the precise embodiments described, and that various modifications may be practiced within the scope of the invention defined by the appended claims.

I claim:

1. A pattern recognition method for determining the category of an unknown pattern, the category being one of a set of categories corresponding to a set of known patterns, the method comprising:

provided a subcategory-level recognition dictionary adapted to store reference information for each one of plural subcategories obtained by partitioning the categories comprising the category set, wherein each of the categories is partitioned into the subcategories by at least one partitioning vector;

receiving a pattern signal representing the unknown pattern and processing the signal to extract a feature vector therefrom;

selecting the reference information of one subcategory of each category in the recognition dictionary in response to the feature vector, the reference information of one subcategory of each category being selected from the recognition dictionary, and calculating the inner product of the feature vector and at least one partitioning vector; and determining a distance between the feature vector and the selected reference information of the subcategory of each category to determine the category of the unknown pattern;

wherein there are n partitioning vectors, n being a positive integer; and wherein selecting the reference information of one subcategory of each category in the recognition dictionary further comprises:
  initializing an index i to 0, i being a positive integer, and
  iterating the following processes upon the index i being less than n:
    comparing the i-th inner product with a threshold and generating $Z_i(k)=1$ when the inner product is greater than the threshold and otherwise generating $Z_i(k)=0$; and
    accumulating the results of multiplying $2^i$ by $Z_i(k)$ to generate an index of a selected subcategory.

2. The method of claim 1, wherein the distance between the feature vector and the reference information comprises a modified Euclidean distance.

3. A method of generating a subcategory-level recognition dictionary for use in pattern recognition, the recognition dictionary including reference information for each one of plural subcategories comprising a category set, the recognition dictionary being generated in response to feature vectors extracted from training signals representing respective training patterns, the method comprising:
  partitioning each category into $2^n$ subcategories, wherein n is an integer greater than zero, and wherein partitioning each category into subcategories includes defining at least one partitioning vector for the category in response to the feature vectors of the training patterns in the category, the at least one partitioning vector partitioning the category into subcategories; and
  applying learning by discriminant analysis to each subcategory to generate the reference information for this subcategory, applying learning by discriminant analysis comprising:
    defining preliminary reference information for each subcategory;
    performing a pattern recognition operation on the training patterns using the preliminary reference information to determine a subcategory for each of the training patterns;
    evaluating the recognition result of the pattern recognition operation on each training pattern against the subcategory to which the training pattern was allocated to define a rival pattern set for each subcategory; and
    performing a linear discriminant analysis between a category pattern set and the rival pattern set of each subcategory to generate reference modifying information for modifying the initial reference information to generate the reference information for the subcategory.

4. The method of claim 3, wherein partitioning each category into subcategories includes allocating each of the training patterns in the category to one of the subcategories of the category in response to the feature vectors of the training patterns in the category and the at least one partitioning vector.

5. A pattern recognition apparatus adapted to determine the category of an unknown pattern represented by a feature vector extracted from a pattern signal, the category being one of a set of categories corresponding to a set of known patterns, the apparatus comprising:
  a subcategory-level recognition dictionary adapted to store reference information for each one of plural subcategories obtained by partitioning the categories comprising the category set in which each of the categories is partitioned into the subcategories by at least one partitioning vector;
  a selecting module adapted to select the reference information of one subcategory of each category in response to the feature vector, the reference information of one subcategory of each category being selected from the recognition dictionary;
  a distance determining module adapted to determine a distance between the feature vector and the reference information of the subcategory selected by the selecting module for each of the subcategories; and
  a module adapted to determine the category of the unknown pattern from the distance generated by the distance determining module for each of the categories;
  wherein the selecting module further comprises a module adapted to calculate and inner product of the feature vector and the at least one partitioning, vector; and
  wherein there are n partitioning vectors, n being a positive integer; and
  wherein the selecting module further comprises:
    a module adapted to initialize an index i to 0, i being a positive integer, and
    a processing module adapted to generate an index of a selected subcategory upon the index i being less than n, the processing module comprising:
      a comparative adapted to compare the i-th inner product with a threshold and to generate $Z_i(k)$ in a 1 state when the inner product is greater than the threshold and to otherwise generate $Z_i(k)$ in a 0 state; and
      a multiplier adapted to multiply $2^i$ by $Z_i(k)$ to generate a product; and
      an accumulator adapted to accumulate the products generated by the multiplier to generate an index of a selected subcategory.

6. An apparatus for generating a subcategory-level recognition dictionary for use in pattern recognition, the recognition dictionary including reference information for each of plural subcategories, this subcategory is being subcategories of categories comprising a category set, the reference information being generated from feature vectors extracted from training pattern signals representing training patterns, the apparatus comprising:
  a partitioning section adapted to partition each category into $2^n$, wherein n is a positive integer greater than zero; and
  a section adapted to applying learning by discriminant analysis to each subcategory defined by the partitioning section to generate the reference information for the subcategory;
  wherein the section adapted to apply learning by discriminant analysis further comprises:
    a preliminary reference information module adapted to define preliminary reference information for each subcategory;

a pattern recognition module adapted to perform pattern recognition on the training patterns using the preliminary reference information to determine a subcategory for each of the training patterns as a recognition result;

a result of valuation module adapted to evaluate the recognition result generated by the pattern recognition module on each training pattern against the subcategory to which the training pattern was allocated by the allocation module to define a rival pattern set for each subcategory; and a module adapted to perform a linear discriminant analysis between a category pattern set and the rival pattern set of each subcategory to generate reference modifying information to modify the preliminary reference information to generate the reference information for the subcategory.

7. The apparatus of claim 6, wherein the partitioning section is adapted to partitioned the category into the subcategories using at least one partitioning vector and wherein the partitioning section further comprises:

a partitioning vector generator adapted to define the at least one partitioning vector for the category in response to the feature vectors of the training patterns in the category and a subcategory allocation module adapted to operate in response to the feature vectors of the training patterns and each category and the at least one partitioning vector for the category to allocate each of the training patterns in the category to one of the subcategories of the category.

* * * * *